2,847,429
PROCESS FOR THE PREPARATION OF 3-ENOL LOWER ALKANOYL ACYLATES OF 17β-ACYL-OXY Δ⁴-ANDROSTENE-3-ONE

Alberto Ercoli, Milan, and Pietro de Ruggieri, Casatenovo Brianza, Italy; said de Ruggieri assignor to Francesco Vismara Societa per Azioni, a company of Italy No Drawing. Application January 27, 1956
Serial No. 561,949

7 Claims. (Cl. 260—397.5)

This invention relates to a new method for preparing enol esters of Δ⁴-3-ketosteroids and to a series of substances which we have found to be advantageous starting materials for the preparation of the same.

It is known that the 3-enol esters of ketosteroids are obtained, according to the methods described in the chemical literature, by treating in a proper manner the ketones having a free 3-carbonyl group with suitable acylating agents.

We have now found that enol esters of Δ⁴-3-ketosteroids can be very advantageously obtained by treating the condensation derivatives of the enolic form of Δ⁴-3-ketosteroids with an organic acid anhydride in the presence of a strong acid.

By the term condensation derivatives of the enolic form of Δ⁴-3-ketosteroids, we mean chiefly the products which may be considered deriving from the condensation of the enolic form of Δ⁴-3-ketosteroids with mono- and bivalent alcohols and with mono- and bivalent thio-alcohols, i. e. the enol ethers, the thioenol ethers and the cyclic ketals and thioketals of Δ⁴-3-ketosteroids.

We have noted indeed that these products, wherein the original Δ⁴-3-ketogroup of the steroid have been already converted into a protected enolic form, are very suitable starting materials for the 3-enol esterification.

In the practical use of our invention one among the above mentioned starting materials is contacted in the presence of a strong acid with an excess of organic acid anhydride, diluted with a suitable solvent.

It is usually preferred to use as diluent an inert solvent, such as aromatic or non aromatic, hydrocarbons, for example, benzene and homologues, cyclohexane and the like. One may also employ, as suitable diluents, halogenated organic solvents, as chloroform, methylene chloride and the like, or the organic acid corresponding to the anhydride itself.

Among the strong acids we have found particularly suitable the organic sulfonic acids such as the benzenesulfonic, the p.toluenesulfonic, the naphthalenesulfonic, the sulfosalicylic, the phenolsulfonic and anthraquinonsulfonic acids. Besides, the perchloric acid or also the Lewis' acids, such as SnCl₄, or SbCl₅, or AlCl₃ may be advantageously employed.

The step of 3-enol esterification, according to the present invention, may be carried out at a temperature between the boiling point of the employed solvent and 0° C.; however at room temperature or at about room temperature is more suitable for the formation of the desired 3-enol ester. This product is then isolated from the reaction mixture by precipitation from its solution with water, in which it is insoluble, or also by extraction with a suitable solvent and evaporation thereof.

When in the above mentioned starting material another unprotected ketogroup is present, the method of the present invention leads generally to the selective formation of enol ester at the C₃-position.

Thus, for example when the 3-enol benzyl ether of progesterone is subjected, according to our invention, to the action of acetic anhydride in the presence of a strong acid and this step is carried out at room temperature or about room temperature, the only 3-enol acetate of progesterone is easily obtained. Likewise by starting from the 3-enol ethyl ether of Δ⁴-androstene-3,17-dione, by treatment with acetic anhydride, suitably diluted with acetic acid or benzene, in the presence of an organic sulfonic acid, the pure 3-enol-acetate of Δ⁴-androstene-3,17-dione melting at 137–139° is very simply prepared.

When the starting condensation derivative of the enolic form of the Δ⁴-3-ketosteroid contains in the molecule one or also more free hydroxyl groups, the method of the present invention, besides leading to the formation of the enol ester at 3 position, leads mostly also to the esterification of the free hydroxyl group or groups. In such a manner it is possible to obtain the 3-enol-acetate of 17α,21-diacetate of cortisone by contacting the 3-enol-ethyl ether of cortisone 21-acetate with acetic anhydride in the presence of p.toluenesulfonic acid.

Furthermore if in the starting material already esterified hydroxyl groups are contained, they are not modified by the 3-enol esterification step carried out according to the present invention. Thus, for instance, if the 3-enol ethyl ether of testosterone 17β-phenylpropionate is treated with trimethylacetic anhydride, in the presence of Lewis' acid or of an organic sulfonic acid, the 3-enol trimethylacetate of testosterone 17β-phenylpropionate is obtained.

The method of the present invention can also serve to directly convert, by one step, an enol ester of a Δ⁴-3-ketosteroid into another enol ester of the same Δ⁴-3-ketosteroid.

To this purpose if a 3-enol ester dissolved in a suitable diluent, is contacted, at room temperature and in the presence of a strong acid, with an organic acid anhydride, another 3-enol ester is obtained, wherein the introduced acylic group corresponds to the employed anhydride. Thus, for instance, if the 3-enol-acetate of 17-phenylpropionate of testosterone is treated, at room temperature and in the presence of an organic sulfonic acid, with isobutyric anhydride, suitably diluted with isobutyric acid or benzene, the 3-enol isobutyrate of testosterone 17-phenylpropionate is easily obtained.

The following examples illustrate the invention, but it is to be understood that the same are given for purposes of illustration and not of limitation.

Example 1

A solution of 1 g. of 3-enol-benzyl-ether of progesterone in 10 cc. of glacial acetic acid and 4 cc. of acetic anhydride is treated with 1 g. of sulfosalicylic acid at room temperature for 3 hours. After dilution with water, the reaction mixture is cooled in ice-bath, and the separated product is collected by filtration, washed with water and dried in the vacuum. The 3-enol-acetate of progesterone once crystallised from methanol melts at 137–139°.

This step may be carried out employing as diluent instead of the glacial acetic acid, the benzene or toluene.

Likewise, instead of sulfosalicylic acid, the perchloric acid or also a Lewis' acid such as SnCl₄ or SbCl₅, may be advantageously used.

Example 2

500 mg. of 3-enol-ethyl-ether of Δ⁴-androstene-3,17-dione, dissolved in 10 cc. of anhydrous benzene, are treated with 3 cc. of acetic anhydride and 500 mg. of p.toluenesulfonic acid. After standing at room temperature for 3 hours, the benzene solution is washed at first with a diluted solution of alkali and then thoroughly with water, dried over sodium sulfate and the solvent evaporated in vacuo. The residue crystallised from methanol slightly diluted with water, yields 335 mg. (64% of the theoretical amounts) of 3-enol-acetate of Δ⁴-androstene-3,17-dione, M. P. 136–138°.

The same result is reached by using as diluent instead of benzene, toluene or cyclohexane and by employing as strong acid, instead of the p.toluenesulfonic, another organic sulfonic acid such as the benzenesulfonic acid, and the naphthalene or anthraquinone α or β sulfonic acids.

Example 3

500 mg. of 3-ethyleneglycol ketal of Δ⁴-androstene-3,17-dione are dissolved in 5 cc. of glacial acetic acid and 2 cc. of acetic anhydride and the solution is treated with 500 mg. of p.toluenesulfonic acid. After standing at room temperature for 3 hours, the mixture is diluted with water and the crystalline product which separates is filtered, washed with water, dried in vacuo and recrystallised from methanol diluted with a little water. The 3-enol-acetate of Δ⁴-androstene-3,17-dione is so obtained, M. P. 137–139°.

Analogously the 3-enol-acetate of 17-β-phenyl-propionate of testosterone, M. P. 91–92°, is prepared by starting from 3-ethylene glycol ketal of testosterone 17-β-phenylpropionate melting at 173–175°.

*Preparation.*—3-enol-ethyl-ether of cortisone 21-acetate.

5 g. of cortisone 21-acetate are suspended in 100 cc. of anhydrous benzene and 40 cc. of the solvent are distilled in order to take out azeotropically eventual traces of moisture. To the remaining mixture brought up to 60° C. are added 5 g. of ethyl orthoformate, 2.56 cc. of absolute ethanol and 0.23 cc. of a 7% solution of hydrochloric acid in absolute ethyl alcohol. The heating is again maintained at about 60° C. for about one hour; during this period all the product passes into solution. The reaction mixture is then allowed to cool, 3 cc. of pyridine are added and the liquid is evaporated in the vacuum to dryness. The residue crystallised from methyl alcohol yields the 3-enol-ethyl-ether of cortisone 21-acetate, M. P. 193°.

Example 4

500 mg. of the 3-enol-ethyl-ether of cortisone 21-acetate, prepared as above described, are dissolved in 10 cc. of acetic acid and treated with 5 cc. of acetic anhydride and 400 mg. of p.toluenesulfonic acid. After standing at room temperature for 3 hours, the solution is diluted with water and repeatedly extracted with ether; the collected ethereal extracts are washed at first with dilute sodium carbonate solution and then with water to neutrality, dried over sodium sulfate and evaporated to dryness. The crystalline residue recrystallised from methanol containing a little water yields the 3-enol-acetate of cortisone 17α,21-diacetate, M. P. 153–154°.

In essentially the same manner the 3-enol-acetate of the following compounds are prepared: the 3-enol-acetate of desoxycorticosterone 21-acetate melting at 126–128°, starting from 3-enol-benzyl-ether of desoxycorticosterone 21-acetate, M. P. 158–160°; the 3-enol-acetate of cortisone 17α-21-diacetate melting at 151–153°, starting from 3-enol-benzyl-ether of 21-acetate of cortisone, M. P. 204–205°; the 3-enol-acetate of 17-β-acetoxy-17-α-methyltestosterone melting at 99–101°, starting from 3-enol-benzyl-ether of 17-α-methyltestosterone, M. P. 83–85°; the 3-enol-acetate of 17-α-acetoxy testosterone melting at 198–201°, starting from 3-enol-ethyl-ether of testosterone, M. P. 119–121°.

Example 5

1 g. of 3-enol-ethyl-ether of testosterone 17-β-phenylpropionate (prepared according to the process described in the continuation-in-part Serial No. 497,388, filed March 23, 1955, to our copending application Serial No. 404,378, filed January 15, 1954) is dissolved in 10 cc. of isobutyric acid and 4 cc. of isobutyric anhydride. The solution is treated with 1 g. of p.toluenesulfonic acid for 3 hours at room temperature, it is then diluted with water and repeatedly extracted with ether; the ethereal extracts are collected, washed with diluted solution of alkali and with water, dried over sodium sulfate and evaporated in the vacuum. From the residue, crystallised twice from methanol, the 3-enol-isobutyrate 17-β-phenylpropionate of testosterone is obtained, M. P. 110–111°.

Likewise if, always starting from 3-enol-ethyl-ether of testosterone 17-β-phenylpropionate, the step is carried out with trimethylacetic anhydride, instead of the isobutyric-one, the 3-enol-trimethyl-acetate of 17-β-phenylpropionate of testosterone is obtained, M. P. 106–109°.

Analogously the 3-benzyl-thioenol ether of testosterone 17-β-phenylpropionate melting at 123–125°, by treatment with acetic anhydride and p. tuluene-sulfonic acid, yields the 3-enol-acetate of testosterone 17-β-phenylpropionate, M. P. 90–92°.

Example 6

500 mg. of 3-enol-acetate of 17-β-phenylpropionate of testosterone are dissolved in 10 cc. of isobutyric acid and treated with 4 cc. of isobutyric anhydride and 500 mg. of p.toluenesulfonic acid. After standing at room temperature for 6 hours, the solution is then diluted with water and repeatedly extracted with ether; the ethereal layer is at first washed with diluted solution of alkali and then with water, dried over sodium sulfate and evaporated in the vacuum. From the residue, after one crystallisation from methanol, the 3-enol-isobutyrate 17-β-phenyl-propionate of testosterone is obtained, M. P. 109–111°.

What we claim is:

1. A process for the preparation of 3-enol lower alkanoyl acylates of 17β-acyloxy Δ-4-androstene-3-one which comprises reacting at approximately room temperature a compound selected from the group consisting of (a) 3-enol lower alkyl ethers and benzyl ether and (b) 3-ethylene glycol ketal of 17β-acyloxy Δ-4-androstene-3-one, wherein the acyl group is the radical of an organic carboxylic acid containing from one to nine carbon atoms inclusive, with an anhydride of a lower alkanoic acid, in the presence of a strong acid selected from the group consisting of perchloric acid, Lewis' acids and organic sulfonic acids to produce a 3-enol lower alkanoyl acylate of 17β-acyloxy-Δ-4-androstene-3-one.

2. A process for the preparation of 3-enol lower alkanoyl acylates of 17β-acyloxy Δ-4-androstene-3-one which comprises reacting at approximately room temperature a 3-enol ether selected from the group consisting of enol lower alkyl ethers and benzyl ether of 17β-acyloxy Δ-4-androstene-3-one, wherein the acyl group is the radical of an organic carboxylic acid containing from one to nine carbon atoms inclusive, with an anhydride of a lower alkanoic acid, in the presence of a strong acid selected from the group consisting of perchloric acid, Lewis' acids and organic sulfonic acids to produce a 3-enol lower alkanoyl acylate of 17β-acyloxy Δ-4-androstene-3-one.

3. A process for the preparation of 3-enol lower alkanoyl acylates of 17β-acyloxy Δ-4-androstene-3-one which comprises reacting at approximately room temperature a 3-ethylene glycol ketal of 17-β-acyloxy Δ-4-androstene-3-one wherein the acyl group is the radical of an organic carboxylic acid containing from one to nine carbon atoms inclusive, with an anhydride of a lower alkanoic acid, in the presence of a strong acid selected from the group consisting of perchloric acid, Lewis' acids and organic sulfonic acids to produce a 3-enol lower alkanoyl acylate of 17β-acyloxy Δ-4-androstene-3-one.

4. A process as defined in claim 1 wherein the reaction is carried out in the alkanoic acid corresponding to the employed anhydride.

5. A process as defined in claim 1 wherein the reaction is carried out in a liquid hydrocarbon.

6. A process as defined in claim 1 wherein the reaction is carried out in a halogenated organic solvent.

7. A process as defined in claim 1 wherein the 17β-acyl group is β-phenylpropionyl.

References Cited in the file of this patent

UNITED STATES PATENTS

| | | |
|---|---|---|
| 2,377,571 | Nudenberg | June 5, 1945 |
| 2,416,024 | Senkus | Feb. 18, 1947 |
| 2,451,434 | Dorfman | Oct. 12, 1948 |
| 2,466,738 | Phillips | Apr. 12, 1949 |
| 2,673,867 | Spero | Mar. 30, 1954 |
| 2,697,108 | Rosenbranz | Dec. 14, 1954 |
| 2,698,852 | Beall | Jan. 4, 1955 |